United States Patent [19]

Chang et al.

[11] Patent Number: 5,233,505
[45] Date of Patent: Aug. 3, 1993

[54] SECURITY DEVICE FOR PROTECTING ELECTRONICALLY-STORED DATA

[75] Inventors: Yeng-Ming Chang, 6F. No. 4, Lane 177, Kuang Fu N. Rd., Taipei; Wing-Fai Chun, Chung Li, both of Taiwan

[73] Assignee: Yeng-Ming Chang, Taipei, Taiwan

[21] Appl. No.: 814,699

[22] Filed: Dec. 30, 1991

[51] Int. Cl.⁵ ............... H01R 23/68; H01R 29/00; H05K 7/14
[52] U.S. Cl. .................. 361/7.85; 361/743; 361/744; 361/809; 361/684; 439/43; 439/74; 439/75
[58] Field of Search ............... 235/1 D; 361/392, 395, 361/396, 397, 400, 412, 419, 413, 393, 424; 364/708; 439/43, 74, 75

[56] References Cited

FOREIGN PATENT DOCUMENTS

| 0254785 | 3/1988 | Fed. Rep. of Germany | 439/66 |
| 0621937 | 6/1961 | Italy | 361/412 |
| 63-300589 | 12/1990 | Japan | 439/74 |

OTHER PUBLICATIONS

IBM Disclosure Bulletin "Multiple Electronic Board Interconnect System" vol. 33, No. 3B, Aug. 1990.

*Primary Examiner*—Lincoln Donovan
*Assistant Examiner*—D. Sparks
*Attorney, Agent, or Firm*—Jacobson, Price, Holman & Stern

[57] ABSTRACT

A security device for protecting electronically-stored data comprising a protected circuit board which has a memory device for storing data code and a battery, a plurality of protective circuit boards respectively overlaid on each side of the protected circuit board, and a plurality of connectors connected between the protected circuit board and the protective circuit boards, wherein the printed circuit on each protective circuit board is respectively connected to the printed circuit on the protected circuit board forming into a series electronic circuit. Detaching either protective circuit board from said protected circuit board or damaging either protective circuit board will break the series electronic circuit causing any code data stored in the memory device to be erased.

3 Claims, 3 Drawing Sheets

SECURITY DEVICE FOR PROTECTING ELECTRONICALLY-STORED DATA

BACKGROUND OF THE INVENTION

The present invention relates to a security device for protecting electronically stored-data and relates more particularly to such an security device with a electronically-stored data as key code used in controlling the access to a computer system or computerized equipment.

In a computer system or computerized equipment, there is generally provided an electronic locking device, controlled by an electronic key, which can be a code stored in a memory device, for access to the computer system thereof. If the code data in the memory device is stolen or copied by physical access to the memory device, the computer system or computerized equipment will become disarmed. Therefore, the memory device must be protected from any physical access.

SUMMARY OF THE INVENTION

The present invention has been accomplished under the aforesaid circumstances. It is therefore the main object of the present invention to provide a security device for protecting the key code used in controlling the access to a computer system or computerized equipment, which has means to protect the code data stored therein. According to the present invention, a security device for protecting electronically—stored data is generally comprised of a protected circuit board, which has a battery and a memory device for storing code data, a plurality of protective circuit boards covered on each side of the said protected circuit board, and a plurality of connectors connected between said protected circuit board and said protective circuit boards. The connectors connect the printed circuits of the protective circuit boards to the printed circuit of the protected circuit board forming into a closed series electronic circuit. Once either protective circuit board is detached or damaged by someone in order to physically access to the memory device, the series electronic circuit is broken, the battery power to the memory device is interrupted and therefore, the code data stored in the memory device is lost. By means of the aforesaid arrangement, any code data stored in the memory device will not be stolen or copied.

DETAILED DESCRIPTION OF THE PREFERRED EMBODIMENT

Figure 1:
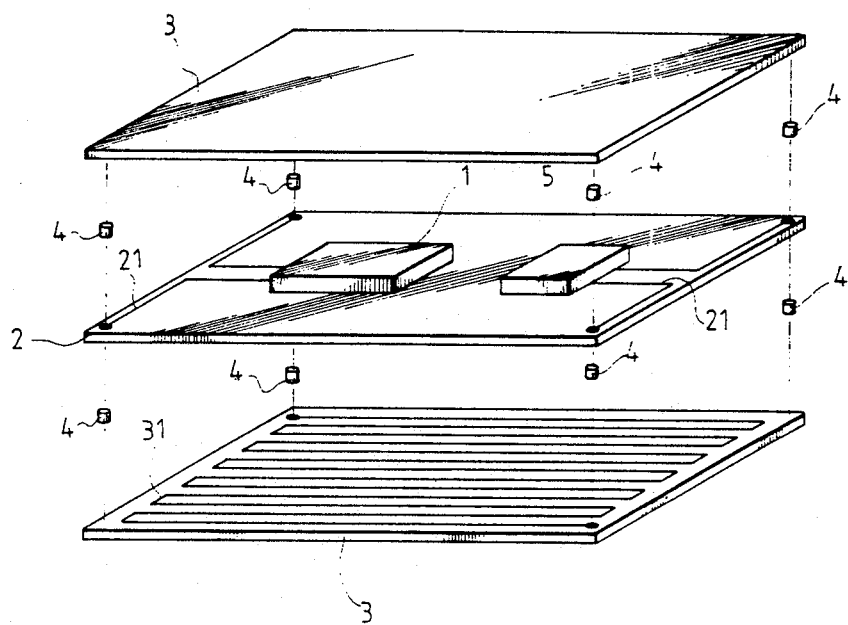
FIG. 1 is an exploded perspective view of the preferred embodiment of the security device for protecting the electronically-stored data of the present invention.
Figure 2:
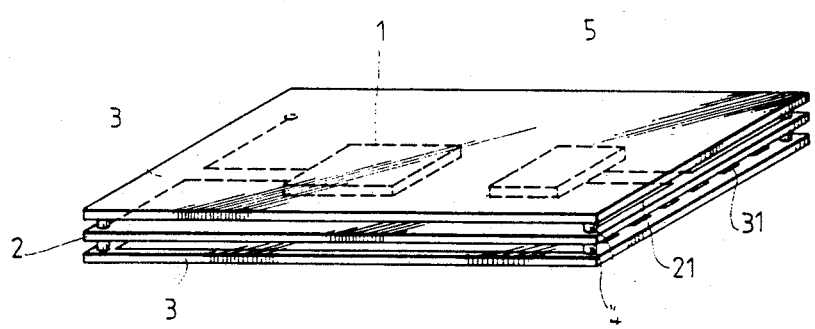
FIG. 2 is a perspective assembly view thereof.

Referring to FIGS. 1 and 2, therein illustrated is a security device embodying the present invention and generally comprised of a protected circuit board 2, which comprises a memory device 1, a battery 5 and other electronic components, a plurality of protective circuit boards 3 attached to said protected circuit board 2 at each side, and a plurality of connectors 4 for connecting said protective circuit boards 3 to said protected circuit board 2.

Figure 3:
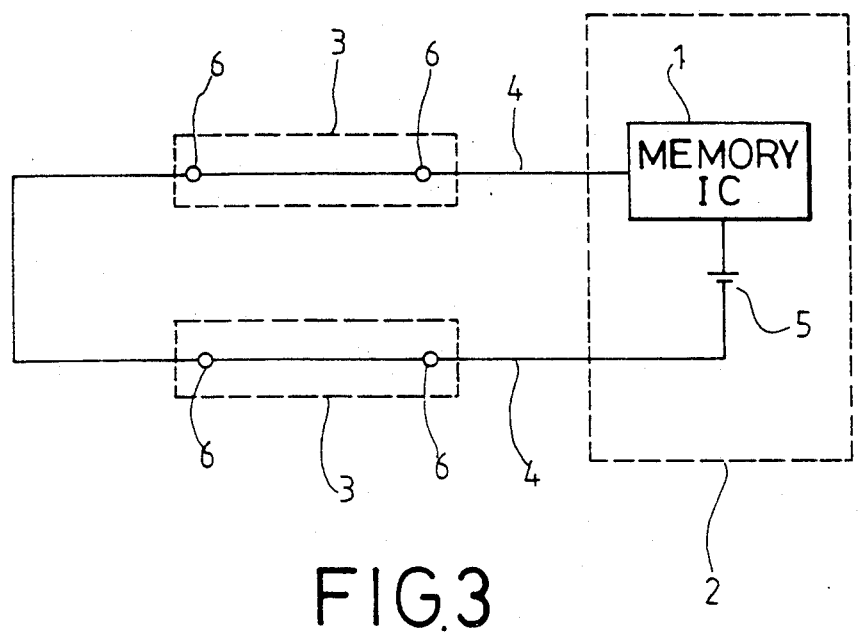
FIG. 3 is a circuit diagram of the series electronic circuit inside the present invention.

In the aforesaid device, the protected circuit board 2 is printed with a printed circuit 21 to which the memory device 1 and the battery 5 are connected in series. The protective circuit boards 3 each is printed with a grid-spaced printed circuit 31. During the assembly process of the device, the protective circuit boards 3 are respectively overlaid on the protected circuit board 2 at two opposite sides and secured thereto by the connectors 4 which serve as conductive terminals or contacts to connect the printed circuits 21, 31 into a series electronic circuit, namely, a security circuit which has a plurality of contacts 6 (see FIG. 3) and is capable of detecting any physical access to the memory device.

Referring to FIG. 3 again, the memory device 1 is provided for electronically storing code data by which a computer or computerized equipment is controlled. Because the printed circuits 31 of the two protective circuit board 3 are connected in series by the connectors and the grid space in each printed circuit 31 is very narrow (preferably within 0.125 mm to 0.2 mm), the security circuit of the device will be broken if someone tries to physically access to the memory device by either detaching the protective circuit board 3 from the protected circuit board 2 or drilling by a tool or damaging the protective circuit board and causing the code data in the memory device 1 to be erased. Therefore, any code data stored in the memory device 1 will not be stolen or copied.

Figure 5:
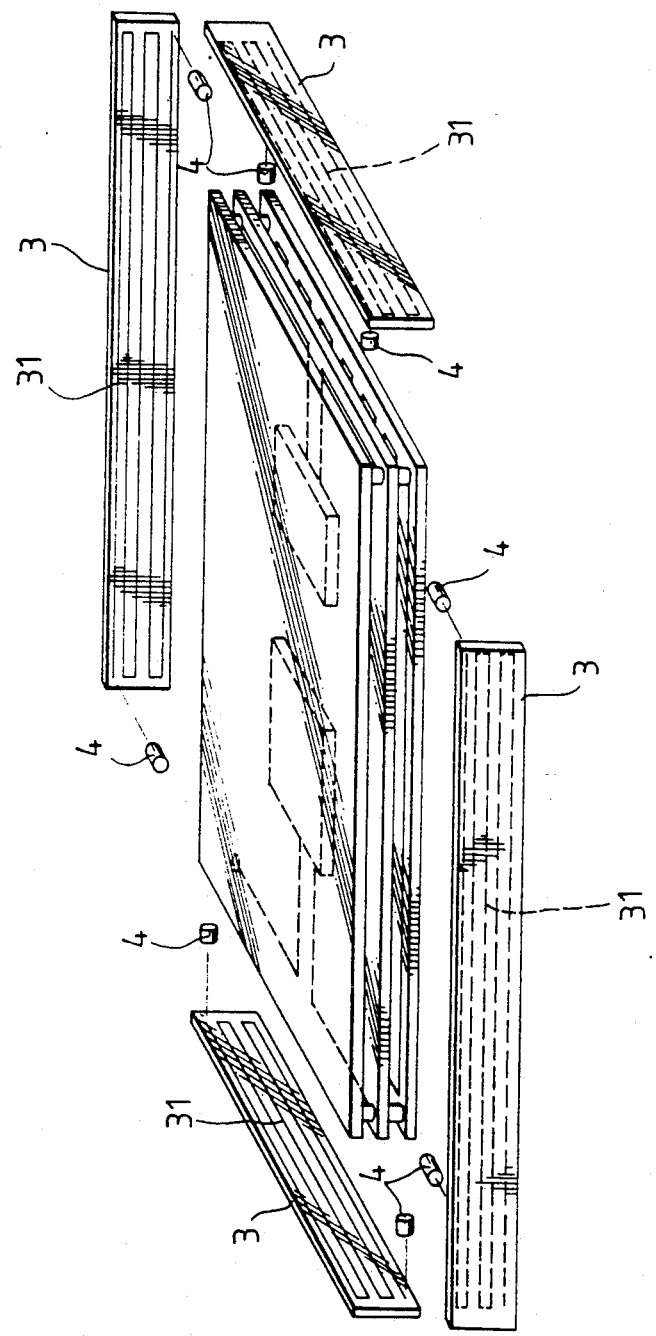

Further, in order to keep the security circuit from being bypassed or damaged the security circuit may be completely concealed inside the protective circuit boards 3 and kept from being accessed from outside. This object can be achieved by several measures shown as follows:

First, in addition to the two protective circuit boards 3 shown on FIG. 1 which are attached to the protected circuit board 2 at two opposite sides (top and bottom), additional protective circuit boards may be attached to each side of the protected circuit board by right angle connectors shown as FIG. 5.

Second, each protective circuit board 3 may be made in a multi-layer form with the circuit 31 printed in the inner layer of the multi-layer circuit board and kept from sight.

Third, the number of contacts 6 may also be increased so as to simultaneously increase the protective effect of the security circuit.

Figure 4:
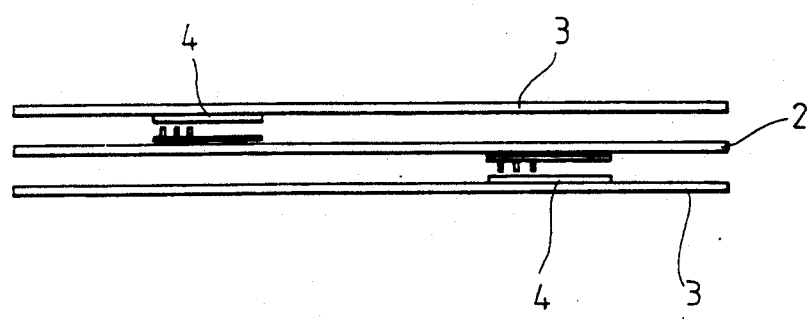
FIG. 4 illustrates that surface mount type of connectors are used to connect the protective circuit boards to the protected circuit board in order to keep the series electronic circuit from being accessed from the outside of the security device.

Further, the connectors 4 can be of a surface mount type for connecting the protective circuit boards 3 to the protected circuit board 2, which will be covered by the protective circuit boards 3 and kept from sight after the assembly of the security device (see FIG. 4).

What is claimed is:

1. A security device for protecting electrically-stored data, comprising:

a protected circuit board having a printed circuit thereon, a plurality of protective circuit boards, said protective circuit boards including a first protective circuit board being overlaid on a top side of the said protected circuit board and a second protective circuit board being overlaid on a bottom side of the said protected circuit board, and a plurality of connectors electronically connecting between said protected circuit board and each of said protective circuit boards;

said protected circuit board comprising a memory device connected to the printed circuit thereon for storing code data;

said at least two protective circuit boards each comprising a grid-spaced pattern printed circuit thereon connected in series with the printed circuit on said protected circuit board by said connectors forming a closed series security circuit including the memory device, so that an attempted access to the protected circuit board will break the closed series circuit and erase the contents of the memory device wherein a width and grid space of adjacent lines of said grid-spaced pattern printed circuit on each protective circuit board is 0.125–0.2 mm.

2. The security device of claim 1, and further comprising battery means connected in series with said memory device on said protected circuit board so that when said closed series circuit is broken, power supply to the memory device is terminated causing the contents of the memory to be erased.

3. The security device of claim 1, and further comprising additional protective circuit boards for attachment to lateral sides of the first and second protective circuit boards to form a closed cubical device in which the protective circuit board is completely enclosed, said plurality of connectors also connecting said additional protective circuit boards in series with the grid spaced printed circuits on the first and second protective circuit boards and the printed circuit on the protected circuit board.

* * * * *